(12) United States Patent
Robillard et al.

(10) Patent No.: US 7,684,961 B1
(45) Date of Patent: Mar. 23, 2010

(54) LIGHT PATH DIAGNOSTICS

(75) Inventors: Michael N. Robillard, Shrewsbury, MA (US); Himanshu Agrawal, Cambridge, MA (US); Daniel Albert Dufresne, II, Bow, NH (US)

(73) Assignee: EMC Corporation, Hopkinton, MA (US)

( * ) Notice: Subject to any disclaimer, the term of this patent is extended or adjusted under 35 U.S.C. 154(b) by 281 days.

(21) Appl. No.: 11/862,253

(22) Filed: Sep. 27, 2007

(51) Int. Cl.
*G06F 11/00* (2006.01)
(52) U.S. Cl. .......................... 702/183; 714/30
(58) Field of Classification Search ................. 702/183, 702/182, 184, 185, 188; 327/126; 714/100, 714/25, 30
See application file for complete search history.

(56) References Cited

U.S. PATENT DOCUMENTS 7,053,601 B1 * 5/2006 Fenske et al. ............... 324/127

* cited by examiner

*Primary Examiner*—Edward Raymond
(74) *Attorney, Agent, or Firm*—Guerin & Rodriguez, LLP; Michael A. Rodriguez

(57) ABSTRACT

Described is an electronics system having an individually replaceable electronics module installed therein. The individually replaceable electronics module includes a component, a light-emitting device (LED) disposed near the component, a processor module for performing diagnostics on the component and producing a message based on results of the diagnostics, and a microcontroller in communication with the processor module to receive the message produced by the processor module. The microcontroller determines whether the component is faulting based on the message. A DC power source is coupled to supply power to the microcontroller after the individually replaceable electronics module is electrically disconnected from the electronics system so that the microcontroller can illuminate the LED if the received message indicates that the component is faulting.

18 Claims, 4 Drawing Sheets

LIGHT PATH DIAGNOSTICS

FIELD OF THE INVENTION

The present invention relates generally to electronics systems. More particularly, the present invention relates to the use of light-emitting devices in diagnostics to indicate faulting components in such electronics systems.

BACKGROUND

Many electronics systems employ self-test diagnostics (i.e., tests that check the correct operation of hardware or software). An important aspect of such testing is to alert a technician upon detection of a fault. Industry-accepted mechanisms for providing instantaneous visibility of a fault include light-emitting devices or diodes (LEDs) and panel displays. Commonly, an LED is placed near a particular module or component within an electronics system to produce an intuitive association between the two. Illuminating the LED thus operates to point directly to the actual faulting component.

Often, a faulting component is part of a sub-assembly housed within a larger electronics assembly. As a result, the illuminated LED is often hidden from view of the technician. Thus, to alert the technician of the faulting component within the sub-assembly, an exposed panel or bulkhead of the electronics assembly has an exposed visible indicator to notify the technician. Although this exposed indicator can direct the technician to the sub-assembly that is experiencing a fault, the technician cannot determine which particular component within the sub-assembly is at fault without uninstalling the sub-assembly from the larger electronics assembly.

Uninstalling the sub-assembly, however, often electrically disconnects the sub-assembly from the larger electronics assembly and, thus, from its source of power. Consequently, any LEDs within the sub-assembly that were lit while the sub-assembly was installed are no longer lit after the sub-assembly is removed. Without electrical power, the LEDs are unable to serve their purpose identifying faulting components.

SUMMARY

In one aspect, the invention features an electronics system comprising an individually replaceable electronics module installed within the electronics system. The individually replaceable electronics module includes a component, a light-emitting device (LED) disposed near the component, a processor module for performing diagnostics on the component and producing a message based on results of the diagnostics, and a microcontroller in communication with the processor module to receive the message produced by the processor module. The microcontroller determines whether the component is faulting based on the message. A DC power source is coupled to supply power to the microcontroller after the individually replaceable electronics module is electrically disconnected from the electronics system so that the microcontroller can illuminate the LED if the microcontroller determines from the received message that the component is faulting.

In another aspect, the invention features an individually replaceable electronics module having a component and a light-emitting device disposed near the component. The individually replaceable electronics module comprises a processor module for performing diagnostics on the component and producing a message based on results of the diagnostics. A microcontroller is in communication with the processor module to receive the message produced by the processor module. The microcontroller determines whether the component is faulting based on the message. A DC power source is coupled to supply power to the microcontroller after the individually replaceable electronics module is electrically disconnected from an external power source so that the microcontroller can illuminate the LED while the individually replaceable electronics module is electrically disconnected from the external power source if the received message indicates that the component is faulting.

In another aspect, the invention features a method for providing diagnostic indications for an individually replaceable unit in an electronics assembly. The method comprises placing a light-emitting device (LED) near a component in the individually replaceable unit. A processor module in the individually replaceable unit performs diagnostics of the component and generates a message based on results of the diagnostics. The processor module transmits the message to a microcontroller in the individually replaceable unit. The microcontroller determines whether the component is faulting based on the message from the processor module. Power is supplied from a DC power source within the individually replaceable unit to the microcontroller when the individually replaceable unit is electrically disconnected from an external power source. The microcontroller illuminates the light-emitting device after the individually replaceable unit is electrically disconnected from the external power source if the microcontroller determines the component is faulting based on the message.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION

In brief overview, field-replaceable units (FRUs) constructed in accordance with the invention implement a light path diagnostics system that enables field service personnel to determine readily which components in a FRU need replacing. Advantageously, the diagnostics system operates after field service personnel has removed the FRU from the chassis of an electronics system, thereby electrically disconnecting the FRU from the electronics system and, thus, from any source of external power. With the FRU electrically disconnected from an external power source, a battery within the FRU supplies power to light-emitting devices (LEDs) disposed adjacent various components in the FRU and to circuitry that controls whether to illuminate the LEDs. Under battery power, the circuitry is able to illuminate any LED associated with a faulty component on the FRU, thereby directing field service personnel to the component.

Figure 1:
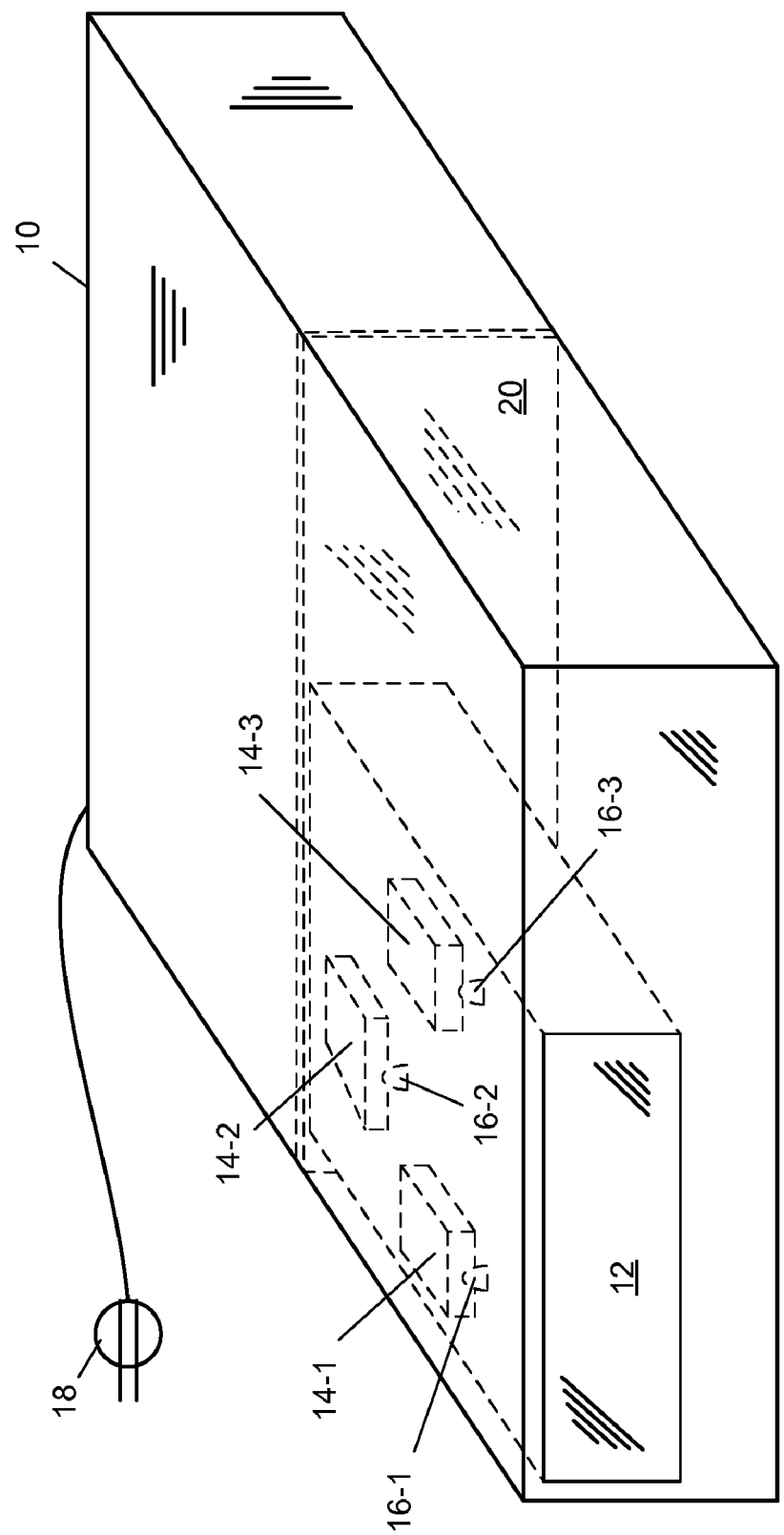
FIG. 1 is a diagram of an embodiment of an electronics system having an installed field-replaceable unit (FRU) constructed in accordance with the invention.

FIG. 1 shows a simplified embodiment of an electronics system 10 in which the principles of the invention may be practiced. The electronics system 10 includes a sub-assembly 12, shown here fully installed and operating within the electronics system 10. The sub-assembly 12 is a field-replaceable unit (FRU) or customer-replaceable unit (CRU): field service personnel or a customer can completely remove and replace the sub-assembly 12 as a single unit.

Any type of electronic system 10 may practice the principles of the invention (e.g., storage system, computing device), that is, any electronic system 10 with a FRU that becomes electrically disconnected from an external power source when removed from the chassis or housing of the electronics system 10. In one embodiment, the electronics system 10 is a storage system (e.g., an EMC Clariion AX or CX series system, produced by EMC Corporation of Hopkinton, Mass.) having an array of disks, redundant power supply units, and redundant storage processor modules (not shown). In such a storage system, the sub-assembly 12 can be one of the storage processor modules.

The sub-assembly 12 includes a plurality of components 14-1, 14-2, and 14-3 (generally, 14). Components 14 may also be referred to herein as modules or devices. Typically, each component 14 is a field-replaceable unit that field service personnel or a customer could remove, for example, for repair or upgrade of the sub-assembly 12, although the invention can be practiced with components that are not FRUs. Examples of components 14 include, but are not limited to, a memory module, an input/out (I/O) module, a CMOS battery, and a FLASH module.

Adjacent each of the components 14-1, 14-2, and 14-3 is an LED 16-1, 16-2, and 16-3 (generally, 16), respectively. The proximity between each LED 16 and one of the components 14 produces an intuitive association between the two. The invention may be practiced with fewer or more LEDs and components than the three LEDs and three components shown. In addition, more than one LED may be associated with any given component without departing from the principles of the invention.

During normal operation, the electronics system 10 is plugged into an AC power outlet (represented by the plug 18 extending from one side of the system). In general, power supply units (not shown) within the electronics system 10 convert the AC power into voltages needed by the various FRUs installed in the electronics system 10. Typically, the power supply units and FRUs plug into a midplane 20 (or backplane) and the supply of power is routed from the power supplies to the FRUs over the midplane 20. Uninstalling the FRU 12 from the electronics system 10 unplugs the FRU 12 from the midplane 20, thus electrically disconnecting the FRU 12 from the external source of power.

Figure 2:
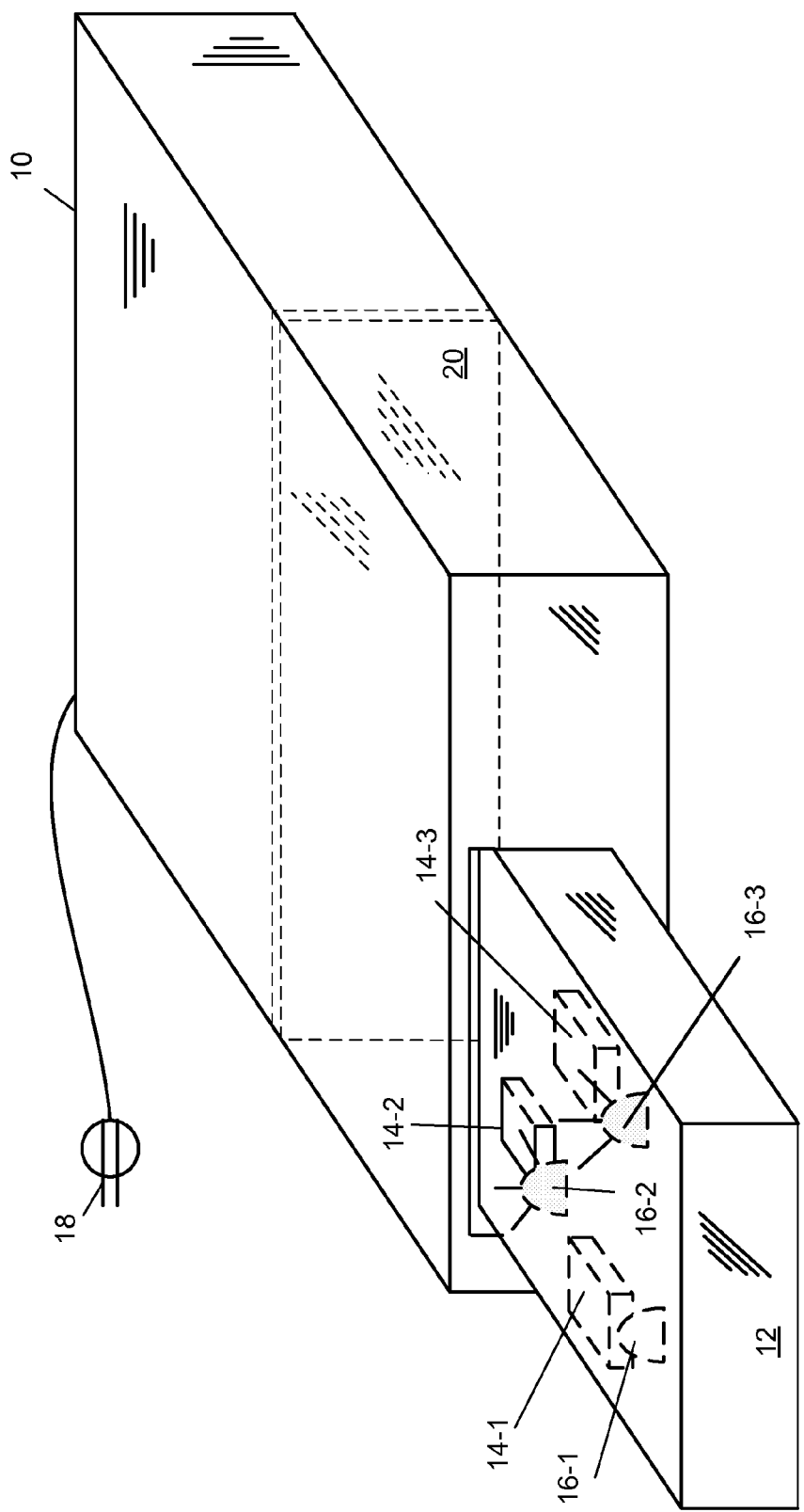
FIG. 2 is a diagram of the electronics system with the FRU partially removed from the electronics system.

FIG. 2 shows the sub-assembly 12 partially removed from the electronics system 10. In this position, the sub-assembly 12 is electrically disconnected from the midplane 20. The dotted lines representing the components 14 and LEDs 16 indicate that they are housed within the sub-assembly 12, and are not visible until field service personnel opens the sub-assembly housing. Here, as an example, LEDs 16-2 and 16-3 are illuminated, although the sub-assembly 12 is no longer receiving electrical power from the external power source. In one embodiment, the LEDs do not illuminate until after the sub-assembly 12 becomes unplugged from the electronics system 10. Illuminating these LEDs 16-2, 16-3 directs the attention of field service personnel to components 14-2 and 14-3, respectively, signifying that the components are faulting.

Figure 3:
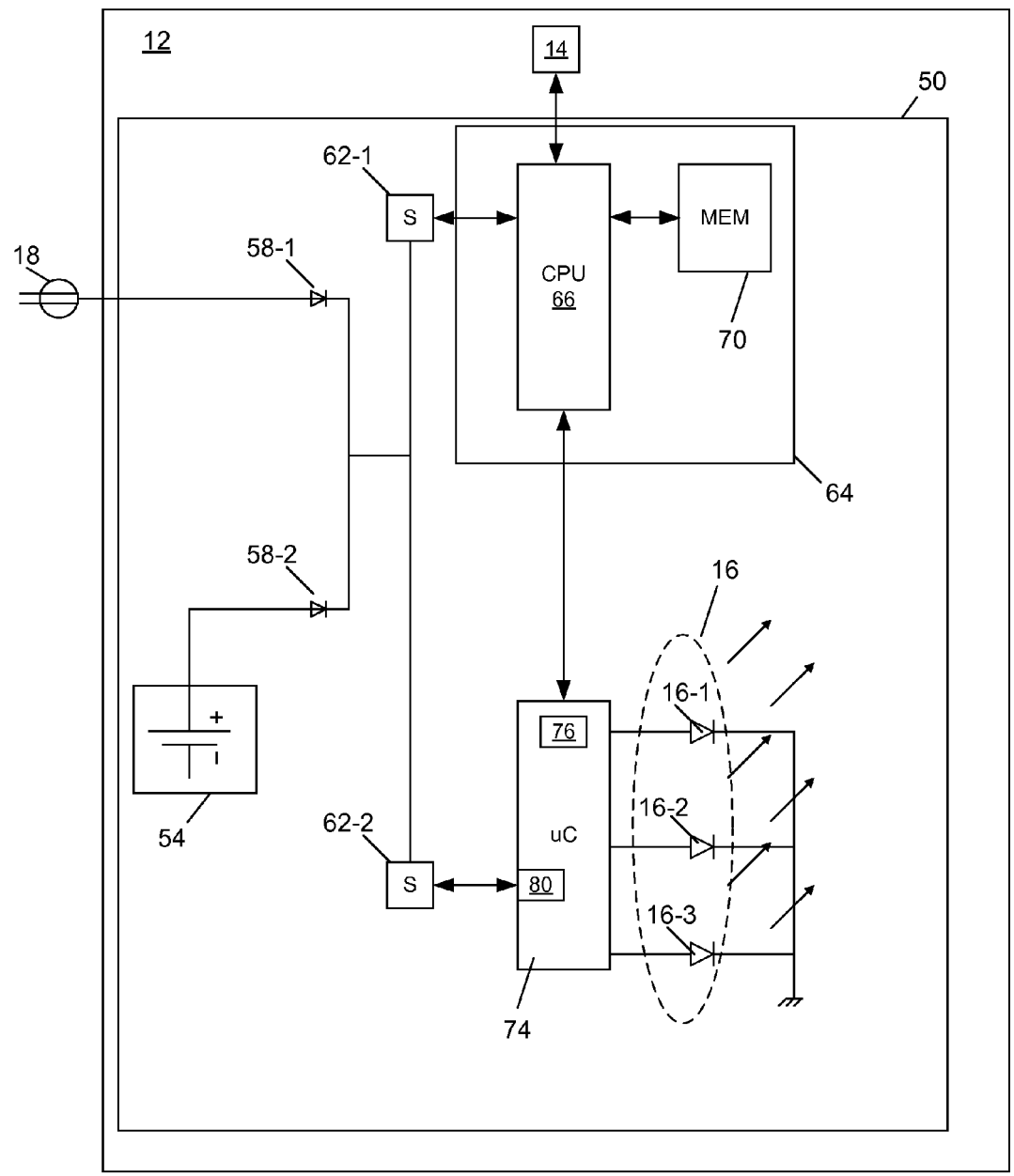
FIG. 3 is a diagram of an embodiment of logic for providing light path diagnostics in accordance with the invention.

FIG. 3 shows an embodiment of circuitry 50 (also called logic) for providing diagnostic indicators using light-emitting devices in accordance with the principles of the invention. The circuitry 50 includes an onboard battery 54, a pair of diodes 58-1 and 58-2, a pair of switches 62-1 and 62-2, a processor module 64, a microcontroller 74, and LEDs 16. An external source of power, symbolically represented by the electrical plug 18, supplies power to the FRU 12, which houses the circuitry 50.

The battery 54 provides a back-up source of DC power in the event of electrical disconnection from the external power source. Electrical power from the external power source passes to an input terminal of a diode 58-1. DC power from the battery 54 passes to an input terminal of a diode 58-2. The output terminal of each diode 58-1, 58-2 is in communication with the switches 62-1, 62-2. When power from the external power source is present, diode 58-1 is on, while diode 58-2 is off, and the processor module 64 and microcontroller 74 draw power from the external power source, and not from the battery 54. When external power is absent, diode 58-1 is off, while diode 58-2 is on, and the processor module 64 and microcontroller 74 draw power from the battery 54.

The processor module 64 includes a central processing unit (CPU) 66 in communication with memory 70. The CPU 66 is also in communication with the switch 62-1, the microcontroller 74, and with the various field-replaceable components 14. The CPU 66 to controls whether the switch 62-1 is open or closed. This switch 62-1 can be implemented with a field-effect transistor. When the switch 62-1 is in a closed state, the CPU 66 receives power from either the external power source or from the battery 54, depending upon which of the diodes 58 is on and which is off. When the switch 62-2 is open, the CPU 66 receives no power and does not operate. When operating, in one embodiment the CPU 66 draws approximately 55 watts of power. In one embodiment, the CPU 66 is implemented with an Intel® Pentium® 4 processor manufactured by Intel Corporation of Santa Clara, Calif.

The microcontroller 74 is in communication with the processor module 64, the switch 62-2, and the LEDs 16. Each LED 16-1, 16-2, 16-3 is situated near one of the components 14 (FIG. 1). Illumination of a given LED 16 signifies that the proximate component is faulting. The microcontroller 74 controls whether the switch 62-2 is open or closed. Like the switch 62-1, the switch 62-2 can be implemented by a field-effect transistor. When the switch 62-2 is closed, the microcontroller 74 receives power either from the external power source or from the battery 54; when the switch 62-2 is open, the microcontroller 74 receives no power and is not operating. In one embodiment, the microcontroller 74 draws approximately 1 watt of power while operating.

In addition, the microcontroller includes logic 76 for storing diagnostic messages received from the CPU 66. The logic 76 can be implemented as circuitry (e.g., latches, memory, and a state machine) or as program code. The microcontroller 74 also has logic 80 that implements a timer and functions to open the switch 62-2 when the timer expires. This logic 80 can be implemented in hardware or software. In one embodiment, the microcontroller 74 is implemented with a component from the LPC family of microcontrollers manufactured by NXP Semiconductors of Eindhoven, The Netherlands.

Figure 4:
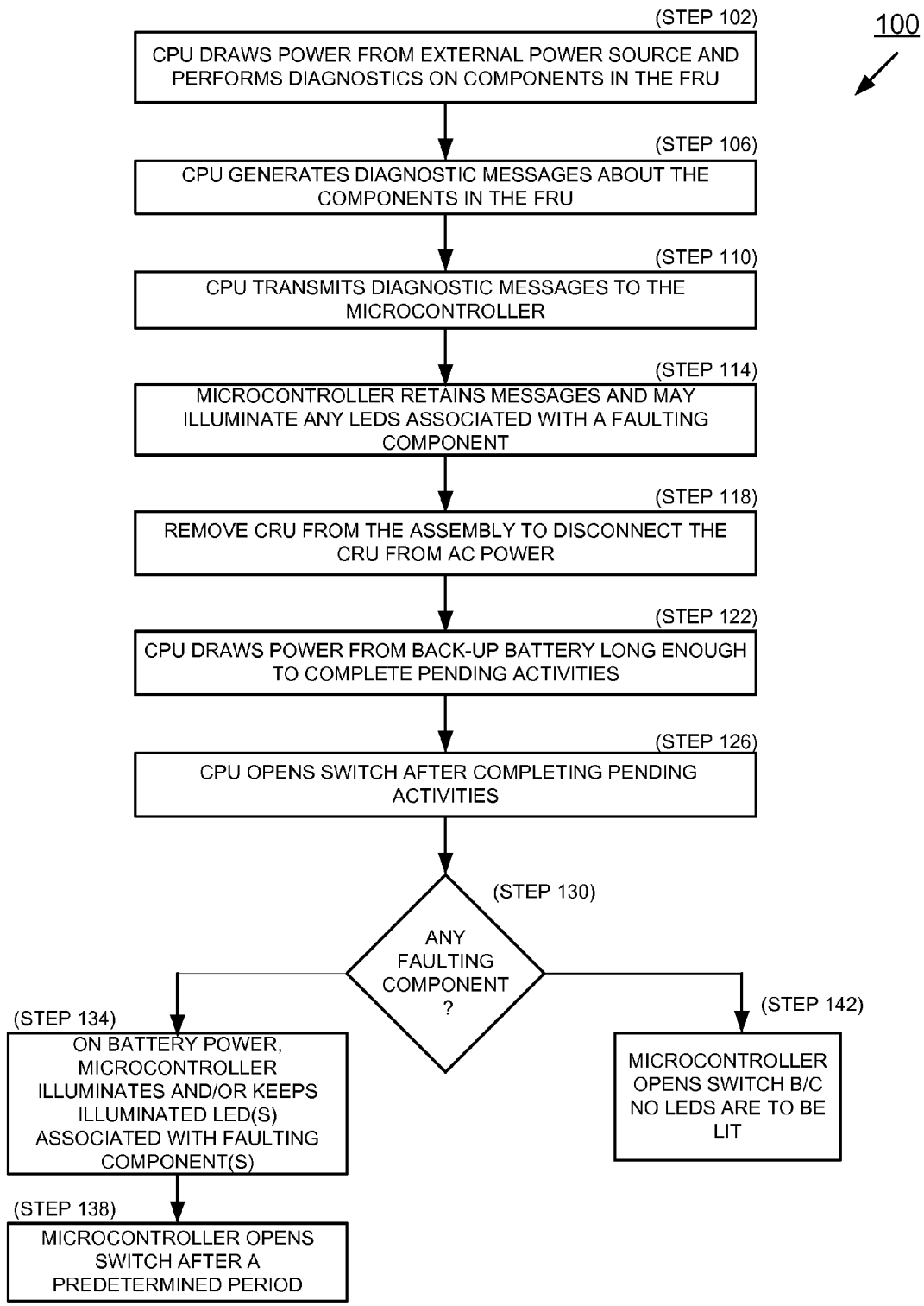
FIG. 4 is a flow diagram of an embodiment of a process for providing light path diagnostics in accordance with the principles of the invention.

FIG. 4 shows an embodiment of a process 100 for providing light path diagnostics in accordance with the invention. In the description of the process 100, reference is made also to FIG. 3. During normal operation of the FRU 12, the processor module 64 and microcontroller 74 draw power from the external power source. The CPU 66 performs (step 102) diagnostics on the various components 14 in the FRU 12. At step 106, the CPU 66 generates diagnostic messages based on results of the diagnostics performed on the components 14. The CPU 66 can continuously or periodically generate and transmit (step 110) these messages to the microcontroller 74. The simplicity or complexity of such messages can depend upon a particular stage of operation in which the FRU 12 is operating. For example, if the FRU 12 is in an early boot stage, the messages may be relatively simple, such as a test code. When the FRU 12 has progressed to a later stage of booting, the messages can be more explicit regarding the functional status of the components 14. The microcontroller 74 stores (step 114) the messages in the logic 76. The microcontroller 74 may also illuminate an appropriate LED immediately upon receipt of a message indicating that a component is faulting. For example, the electronic system may "hang" in BIOS because of a malfunctioning memory module and the associated LED is consequently lit.

Removal of the FRU 12 from the electronics system 10 at step 118 disconnects the FRU 12 from the external power source, causing the processor module 64 and microcontroller 74 to operate on internal power supplied by the battery 54. Any currently illuminated LEDs remain illuminated after removal of the FRU. When the FRU initially switches to battery power, the CPU 66 maintains (step 122) the switch 62-1 in a closed state to ensure that the CPU 66 continues to receive power long enough to complete any activities that are pending or in progress (e.g., writes from cache to memory 70, transmission of messages to the microcontroller 74). After these activities complete, the CPU 66 opens (step 126) the switch 62-1 to cease drawing power from the battery 54, thereby helping prolong battery life. Before opening the switch 62-1, the CPU 66 can send a message or signal to the microcontroller 74 to indicate that all pending activities have completed.

After the CPU 66 has completed pending activities, the microcontroller 74 then analyzes (step 130) the diagnostic messages received from the CPU 66 and stored in the logic 76. If based on these diagnostic messages the microcontroller 74 identifies one or more faulting components 14, the microcontroller 74 illuminates, or keeps illuminated, (step 134) each associated LED(s) 16. Waiting until after the CPU 66 completes pending activities before illuminating an LED can avoid the possibility of field service personnel removing a component 14 before the CPU 66 is finished communicating with that component 14, which could leave the FRU 12 in an intermediate and potentially non-operational state.

After a predetermined period expires (i.e., as determined by the timer of logic 80), the microcontroller 74 opens the switch 62-2 (step 138) to cease drawing power from the battery 54, thereby helping prolong battery life. At that time, any illuminated LED turns off. If, at step 130, the diagnostic messages do not indicate any faulting components 14, no LEDs need illuminating, and the microcontroller 74 opens (step 142) the switch 62-2 to disconnect from the battery 54.

The states of the LEDs persist in the microcontroller 74. When AC power is restored to the FRU 12 (i.e., the FRU is reinstalled in the electronics system) the microcontroller 74 runs on standby power. That is, while AC power flows to a power supply within the electronics system, the microcontroller 74 is operating, although most of the other components in the FRU 12 remain powered off. The microcontroller 74 operating on standby power keeps these other components powered off until it receives an external stimulus (e.g., a command from a peer FRU, or the push of a button). While on standby power, the microcontroller 74 keeps lit any fault LEDs until it receives the external stimulus and successfully sequences power-up for the other components of the FRU. After the microcontroller 74 determines that power-up has been successful, the microcontroller 74 turns off all light path fault LEDs. These LEDs may subsequently become lit again, as described above in connection with the diagnostic process.

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented using hardware (digital or analog), firmware, software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. An electronics system comprising:
    an individually replaceable electronics module installed within the electronics system, the individually replaceable electronics module comprising:
    a component;
    a light-emitting device (LED) disposed near the component;
    a processor module for performing diagnostics on the component and producing a message based on results of the diagnostics;
    a microcontroller in communication with the processor module to receive the message produced by the processor module, the microcontroller determining whether the component is faulting based on the message; and
    a DC power source coupled to supply power to the microcontroller in response to the individually replaceable electronics module becoming electrically disconnected from the electronics system so that the microcontroller can illuminate the LED while the individually replaceable electronics module is electrically disconnected from the electronics system if the microcontroller determines from the received message that the component is faulting.

2. The electronics system of claim 1, wherein the DC power source is coupled to supply power to the processor module to enable the processor module to complete a pending activity after the individually replaceable electronics module is electrically disconnected from the electronics system.

3. The electronics system of claim 2, wherein the individually replaceable electronics module includes a switch through which the DC power source is coupled to the processor module, the processor module opening the switch after completing the pending activity, to disconnect the processor module from the DC power source.

4. The electronics system of claim 2, wherein the microcontroller determines from the received message whether to illuminate the LED after the processor module completes the pending activity.

5. The electronics system of claim 1, wherein the individually replaceable electronics module includes a switch through which the DC power source is coupled to the microcontroller, the microcontroller opening the switch to disconnect the microcontroller from the DC power source when the received message provides no indication that the component is faulting.

6. The electronics system of claim 1, wherein the individually replaceable electronics module includes a timer, and wherein the microcontroller opens a switch to disconnect the microcontroller from the DC power source when the timer expires.

7. An individually replaceable electronics module having a component and a light-emitting device (LED) disposed near the component, the individually replaceable electronics module comprising:
 a processor module for performing diagnostics on the component and producing a message based on results of the diagnostics;
 a microcontroller in communication with the processor module to receive the message produced by the processor module, the microcontroller determining whether the component is faulting based on the message;
 a DC power source coupled to supply power to the microcontroller in response to the individually replaceable electronics module becoming electrically disconnected from an external power source so that the microcontroller can illuminate the LED while the individually replaceable electronics module is electrically disconnected from the external power source if the received message indicates that the component is faulting.

8. The individually replaceable electronics module of claim 7, wherein the DC power source is coupled to supply power to the processor module to enable the processor module to complete a pending activity after the individually replaceable electronics module is electrically disconnected from an external source of power.

9. The individually replaceable electronics module of claim 7, further comprising a timer, and wherein the microcontroller opens a switch to disconnect the microcontroller from the DC power source when the timer expires.

10. The individually replaceable electronics module of claim 8, further comprising a switch through which the DC power source is coupled to the processor module, the processor module opening the switch after completing the pending activity, to disconnect the processor module from the DC power source.

11. The individually replaceable electronics module of claim 10, wherein the microcontroller determines from the received message whether to illuminate the LED after the processor module completes the pending activity.

12. The individually replaceable electronics module of claim 7, further comprising a switch through which the DC power source is coupled to the microcontroller, the microcontroller opening the switch to disconnect the microcontroller from the DC power source if the received message provides no indication that the component is faulting.

13. A method for providing diagnostic indications for an individually replaceable unit in an electronics assembly, the method comprising:
 placing a light-emitting device (LED) near a component in the individually replaceable unit;
 performing, by a processor module in the individually replaceable unit, diagnostics of the component;
 generating, by the processor module, a message based on results of the diagnostics;
 transmitting, by the processor module, the message to a microcontroller in the individually replaceable unit;
 determining, by the microcontroller, whether the component is faulting based on the message from the processor module;
 removing the individually replaceable unit from the electronics assembly;
 supplying power from a DC power source within the individually replaceable unit to the microcontroller in response to the individually replaceable unit becoming electrically disconnected from an external power source when removed from the electronics assembly; and
 illuminating the light-emitting device, by the microcontroller, while the individually replaceable unit is electrically disconnected from the external power source, if the microcontroller determines the component is faulting based on the message.

14. The method of claim 13, further comprising the step of disconnecting the microcontroller from the DC power source after a predetermined period expires.

15. The method of claim 13, further comprising the step of disconnecting the microcontroller from the DC power source if the microcontroller determines that the component is not faulting.

16. The method of claim 13, further comprising supplying power from the DC power source to the processor module when the individually replaceable unit is electrically disconnected from the external power source to enable the processor module to complete a pending activity after the individually replaceable electronics unit is electrically disconnected from the electronics assembly.

17. The method of claim 16, wherein the step of illuminating occurs after the processor module completes the pending activity.

18. The method of claim 16, further comprising the step of disconnecting the processor module from the DC power source after the processor module completes the pending activity.

\* \* \* \* \*